(12) United States Patent
Hashiguchi et al.

(10) Patent No.: US 11,592,949 B2
(45) Date of Patent: Feb. 28, 2023

(54) TOUCH PANEL BUILT-IN DISPLAY WITH DETECTION OF PRESSED STATE IN THE PERIPHERAL REGION

(71) Applicant: Mitsubishi Electric Corporation, Tokyo (JP)

(72) Inventors: Takafumi Hashiguchi, Kumamoto (JP); Tatsuya Nakamura, Kumamoto (JP); Yusuke Shimasaki, Kumamoto (JP); Takeshi Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/097,685

(22) Filed: Nov. 13, 2020

(65) Prior Publication Data

US 2021/0157456 A1  May 27, 2021

(30) Foreign Application Priority Data

Nov. 27, 2019  (JP) .............................. JP2019-214045

(51) Int. Cl.
*G06F 3/044*  (2006.01)
*G06F 3/041*  (2006.01)
*G02F 1/1333*  (2006.01)

(52) U.S. Cl.
CPC .......... *G06F 3/0447* (2019.05); *G06F 3/0412* (2013.01); *G06F 3/0445* (2019.05); *G06F 3/0446* (2019.05); *G02F 1/13338* (2013.01); *G02F 2202/28* (2013.01); *G06F 2203/04105* (2013.01)

(58) Field of Classification Search
CPC .... G06F 3/0447; G06F 3/0412; G06F 3/0446; G06F 3/0445; G06F 2203/04105; G06F 2203/04107
See application file for complete search history.

(56) References Cited

U.S. PATENT DOCUMENTS

| | | | |
|---|---|---|---|
| 2010/0108409 A1* | 5/2010 | Tanaka | G06F 3/0445 345/174 |
| 2011/0018826 A1 | 1/2011 | Shoji | |

(Continued)

FOREIGN PATENT DOCUMENTS

| | | |
|---|---|---|
| JP | 2011-028476 A | 2/2011 |
| JP | 2011-170659 A | 9/2011 |

(Continued)

OTHER PUBLICATIONS

An Office Action; "Notice of Reasons for Refusal," mailed by the Japanese Patent Office dated Oct. 18, 2022, which corresponds to Japanese Patent Application No. 2019-214045 and is related to U.S. Appl. No. 17/097,685; with English language translation.

*Primary Examiner* — Liliana Cerullo
(74) *Attorney, Agent, or Firm* — Studebaker & Brackett PC (57) ABSTRACT

The touch panel built-in display includes a first electrode, a second electrode, and a third electrode for detecting the pressed state in which the protective plate is pressed. The first electrode is provided in the peripheral region on the back surface of the protective plate. The second and third electrodes are provided adjacent to each other in the peripheral region on the principal surface of the sensor substrate. That is, the first electrode, the second electrode, and the third electrode are provided in the peripheral region as a configuration for detecting the pressed state.

15 Claims, 10 Drawing Sheets

(56) References Cited

U.S. PATENT DOCUMENTS

| | | |
|---|---|---|
| 2012/0032907 A1 | 2/2012 | Koizumi et al. |
| 2013/0242485 A1 | 9/2013 | Ohtani et al. |
| 2014/0001025 A1 | 1/2014 | Hinata |
| 2016/0103544 A1* | 4/2016 | Filiz .................... G06F 3/0416 345/174 |
| 2020/0285366 A1 | 9/2020 | Agari et al. |

FOREIGN PATENT DOCUMENTS

| | | |
|---|---|---|
| JP | 2012-103761 A | 5/2012 |
| JP | 2016-076136 A | 5/2016 |
| JP | 2019-086929 A | 6/2019 |
| WO | 2010/122824 A1 | 10/2010 |
| WO | 2018/168423 A1 | 9/2018 |

\* cited by examiner

TOUCH PANEL BUILT-IN DISPLAY WITH DETECTION OF PRESSED STATE IN THE PERIPHERAL REGION

BACKGROUND OF THE INVENTION

Field of the Invention

The present invention relates to a capacitive touch panel built-in display.

Description of the Background Art

A projected capacitive touch panel has been proposed. The projected capacitive method is a method of detecting a touch position based on change in capacitance between a plurality of adjacent touch sensor electrodes. The change in the capacitance occurs when a touch operation using a conductor such as a finger is performed on the touch panel, for example. Japanese Patent Application Laid-Open No. 7017-103761 discloses a configuration of a projected capacitive touch panel (hereinafter, also referred to as "related configuration A").

The touch panel in this method includes a cover panel as a protective plate having an operation surface on which a touch operation is performed. The cover panel is made of robust tempered glass or the like, for example. The cover panel has a thickness of about several mm.

In addition, Japanese Patent Application Laid-Open No. 2011-028476 discloses a touch panel having a configuration for detecting a touch position and a pressed state (hereinafter, also referred to as "related configuration B"). The pressed state is a state in which a member (for example, a transparent protection film) is pressed, in the related configuration B, a change in capacitance between a plurality of touch sensor electrodes, which occurs when the transparent protection film is pressed by a touch operation, is detected. The touch position and the pressed state are detected based on the detection of the change in the capacitance.

The display having a function of detecting a pressed state has a display region for displaying an image and a peripheral region provided on the periphery of the display region. It should be noted that the display region and the peripheral region exist in a plurality of members included in the display.

A protective plate or the like as a protective member is generally provided on the surface side on which the touch operation is to be performed in the display. When the touch operation is performed on the display region of the protective plate, the display region of the protective plate is pressed. When the display region of the protective plate is pressed, the display region of the protective plate has smaller degree of curvature than the peripheral region of the protective plate. The inventors of the present application have found the problem that the configuration provided with a configuration for detecting the pressed state in the display region has a lower detection accuracy of the pressed state than the configuration provided with a configuration for detecting the pressed state in the peripheral region.

It should be noted that since the related configuration A does not have the function of detecting the pressed state, this problem cannot be solved. In addition, the configuration for detecting the pressed state in the related configuration B is a configuration for being used in the display region. Therefore, the related configuration B cannot solve this problem either. Thus, it is required to provide a configuration for detecting the pressed state in the peripheral region.

SUMMARY

It is an object of the present invention to provide a touch panel built-in display provided with a configuration for detecting the pressed state in the peripheral region provided on the periphery of the display region.

A touch panel built-in display according to an aspect of the present invention has a display region for displaying an image and a peripheral region provided on the periphery of the display region. The touch panel built-in display includes: a sensor electrode configured to detect a touch position with respect to the touch panel built-in display, the sensor electrode compatible with a capacitance method; a sensor substrate provided with the sensor electrode; a protective plate configured to cover the sensor substrate, the protective plate having flexibility; and a first electrode, a second electrode, and a third electrode configured to detect a pressed state in which the protective plate is pressed. The sensor substrate has a principal surface on which the display region and the peripheral region exist. The protective plate has a back surface for covering the principal surface of the sensor substrate. The display region and the peripheral region exist on the back surface of the protective plate. In the peripheral region on the back surface of the protective plate, the first electrode is provided. In the peripheral region on the principal surface of the sensor substrate, the second electrode and the third electrode are provided adjacent to each other. The touch panel built-in display detects the pressed state in which the protective plate is pressed based on change in capacitance between the second electrode and the third electrode accompanying change in a distance from the first electrode to the second electrode and a distance from the first electrode to the third electrode.

According to the present invention, the touch panel built-in display includes a first electrode, a second electrode, and a third electrode for detecting the pressed state in which the protective plate is pressed. The first electrode is provided in the peripheral region on the back surface of the protective plate. The second and third electrodes are provided adjacent to each other in the peripheral region on the principal surface of the sensor substrate. That is, the first electrode, the second electrode, and the third electrode are provided in the peripheral region as a configuration for detecting the pressed state.

Thus, it is possible to provide a touch panel built-in display provided with a configuration for detecting the pressed state in the peripheral region.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments will be described with reference to the drawings. In the following drawings, the same components are denoted by the same reference numerals. The names and functions of components denoted by the same reference numerals are the same. Therefore, a detailed description of a part of a component denoted by the same reference numeral m e omitted.

It should be noted that the dimensions, materials, and shapes of components exemplified in the preferred embodiment, relative arrangements of the components, and the like may be appropriately changed according to the configuration, various conditions, and the like of the apparatus. In addition, the dimensions of a component in a drawing may differ from the actual dimensions.

First Preferred Embodiment

Figure 1:
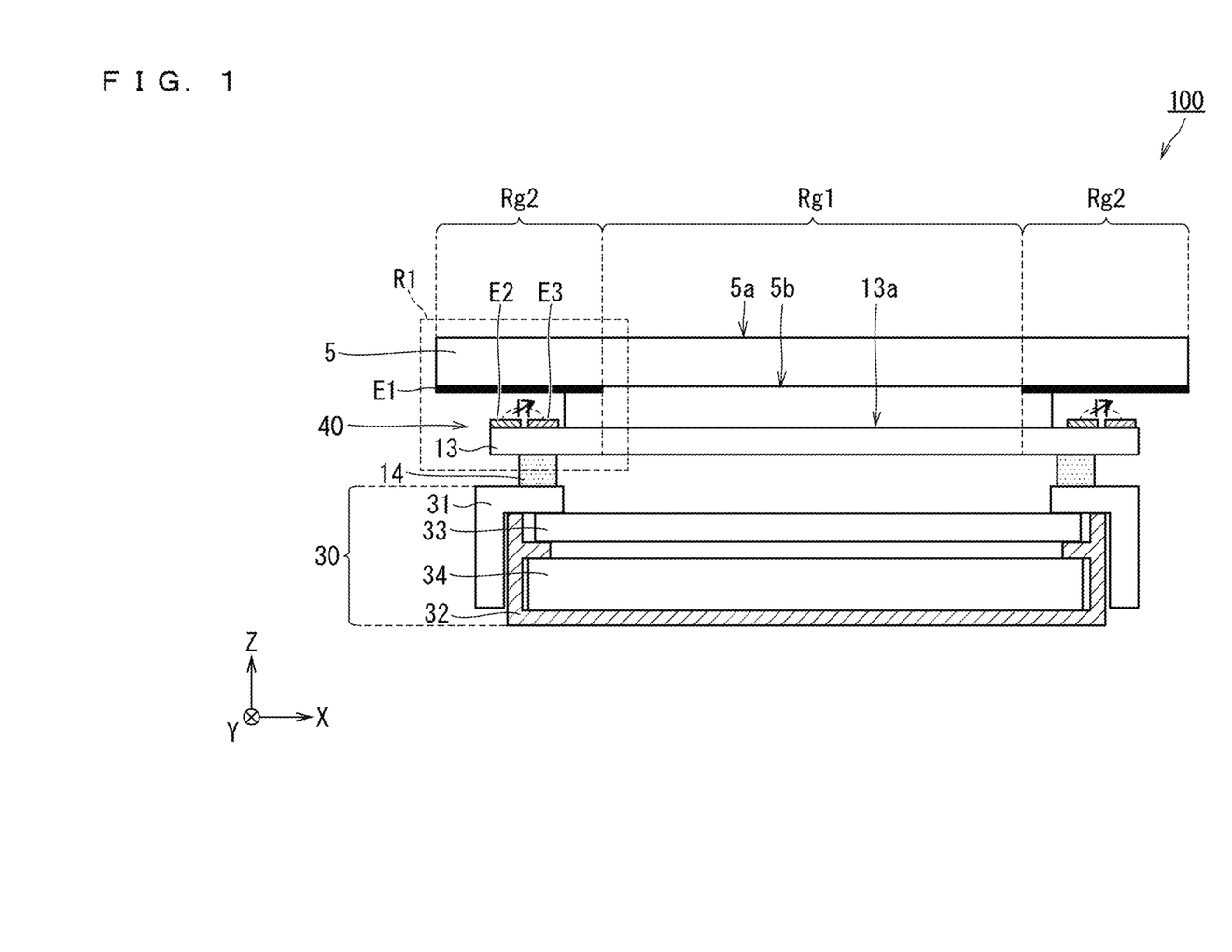
FIG. 1 is a cross-sectional view schematically showing a structure of a touch panel built-in display according to a first embodiment.

FIG. 1 is a cross-sectional view schematically showing a structure of a touch panel built-in display 100 according to a first embodiment. The touch panel built-in display 100 has a function of detecting a touch position and a pressed state. It should be noted that FIG. 1 shows the configuration of a part of the touch panel built-in display 100 in a simplified form. For example, FIG. 1 does not show a protection film 9 described below.

In FIG. 1, X-direction, a Y-direction, and a Z-direction are orthogonal to one another. The X-, Y-, and Z-directions illustrated in the following drawings are also orthogonal to one another. Hereinafter, a direction including the X-direction and a direction opposite to the X-direction (−X-direction) is also referred to as "X-axis direction". In addition, hereinafter, a direction including the Y-direction and a direction opposite to the Y-direction (−Y-direction) is also referred to as "Y-axis direction". In addition, hereinafter, a direction including the Z-direction and a direction opposite to the Z-direction (−Z-direction) is also referred to as "Z-axis direction".

In addition, hereinafter, a plane including the X-axis direction and the Y-axis direction is also referred to as "XV plane". In addition, hereinafter, a plane including the X-axis direction and the Z-axis direction is also referred to as "XZ plane". In addition, hereinafter, a plane including the Y-axis direction and the Z-axis direction is also referred to as "YZ plane".

Figure 2:
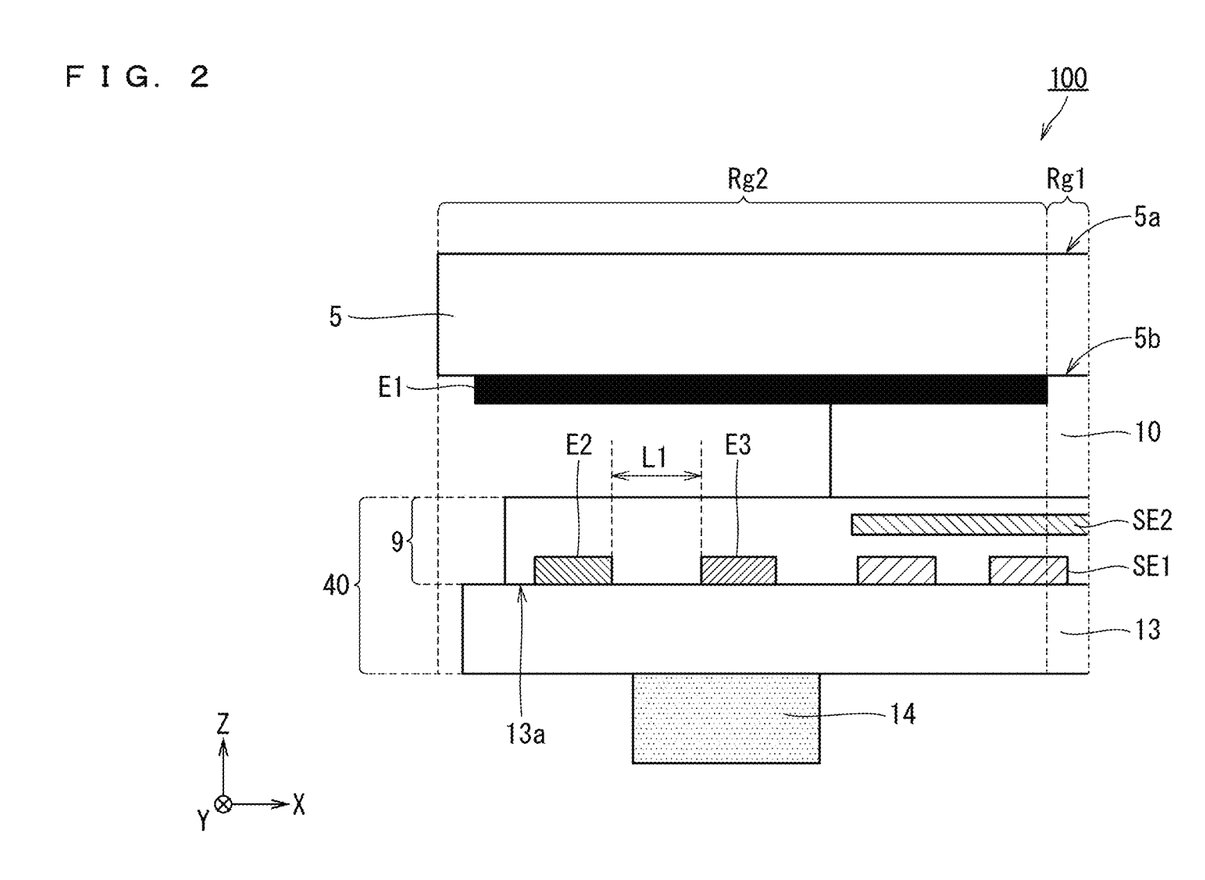
FIG. 2 is an enlarged view of a region R1 in FIG. 1.

FIG. 2 is an enlarged view of the region R1 in FIG. 1. Referring to FIGS. 1 and 2, the touch panel built-in display 100 includes a protective plate 5, a touch panel 40, and a liquid crystal display (LCD) unit 30.

The protective plate 5 is a member that protects the touch panel 40. The protective plate 5 has flexibility. The touch panel 40 has a function of detecting a touch operation. The touch operation is an operation of touching the protective plate 5. That is, the touch panel 40 has a function of detecting a touch position.

The LCD unit 30 has a function of displaying an image. The LCD unit 30 is stuck to the touch panel 40 with an adhesive tape 14. The LCD unit 30 includes a front frame 31, a frame 32, a display panel 33, and a backlight unit 34. The frame 32 holds the backlight unit 34. The front frame 31 and the frame 32 hold the display panel 33. The front frame 31 is fixed to the touch panel 40 with the adhesive tape 14.

The protective plate 5 is stuck to the touch panel 40 with an adhesive material 10. The protective plate 5 covers the touch panel 40 in a plan view. The protective plate 5 has translucency. The protective plate 5 is, for example, a cover glass made of glass. The cover glass is, for example, hard glass. Hardness has the property that, when the hard glass is pressed, only the pressed portion is not recessed locally. When the protective plate 5 is pressed, the entire protective plate 5 is curved. It should be noted that the protective plate 5 may be made of a material other than glass.

The protective plate 5 has a principal surface 5a and a hack surface 5b. The principal surface 5a is a surface on a viewing side. The surface on the viewing side is a surface on the side on which a user views the image. In addition, the principal surface 5a is a surface to be a target on which the touch operation is performed. The back surface 5b covers the touch panel 40 in a plan view.

The adhesive material 10 is, for example, an adhesive. The adhesive material 10 is, for example, a member that elastically deforms. The adhesive material 10 is, for example, an optical clear adhesive (OCA).

The touch panel 40 is, for example, a capacitive touch panel. For example, the touch panel 40 is a projected capacitive touch panel. The touch panel 40 includes a plurality of sensor electrodes described below. The plurality of sensor electrodes are electrodes for detecting a touch position.

In addition, the touch panel built-in display 100 has a display region Rg1 and a peripheral region Rg2. The display region Rg1 is a region for displaying an image. The peripheral region Rg2 is provided on the periphery of the display region Rg1 in a plan view. Specifically, the peripheral region Rg2 is a region surrounding the display region Rg1 in a plan view. The shape of the peripheral region Rg2 in a plan view is closed loop shaped.

It should be noted that the display region Rg1 and the peripheral region Rg2 are applied to the space in which the touch panel built-in display 100 is configured, and also to the XY plane, the XZ plane, and the YZ plane in the space in the same manner as to the touch panel built-in display 100.

That is, the display region Rg1 and the peripheral region Rg2 are applied also to each component (protective plate 5, touch panel 40, or the like) that constitutes the touch panel built-in display 100 in the same manner as to the touch panel built-in display 100. Therefore, for example, as shown in FIGS. 1 and 2, there exist a display region Rg1 and a peripheral region Rg2 in the protective plate 5 of the touch panel built-in display 100. Therefore, the display region Rg1 and the peripheral region Rg2 exist on the back surface 5b of the protective plate 5. It should be noted that the display region Rg1 on the principal surface 5a of the protective plate 5 is also an operation region to be a target on which a touch operation is performed. In addition, there exist a display region Rg1 and a peripheral region Rg2 in the touch panel 40.

Here, assume that a touch operation has been performed on the display region Rg1 being the operation region on the principal surface 5a of the protective plate 5. The touch operation is performed with a below-described indicator 19, which is a conductor, for example. The indicator 19 is, for example, a user's finger. In this case, among the plurality of sensor electrodes in the touch panel 40, the capacitance between the plurality of sensor electrodes corresponding to the touch position where the touch operation is performed changes.

Figure 3:
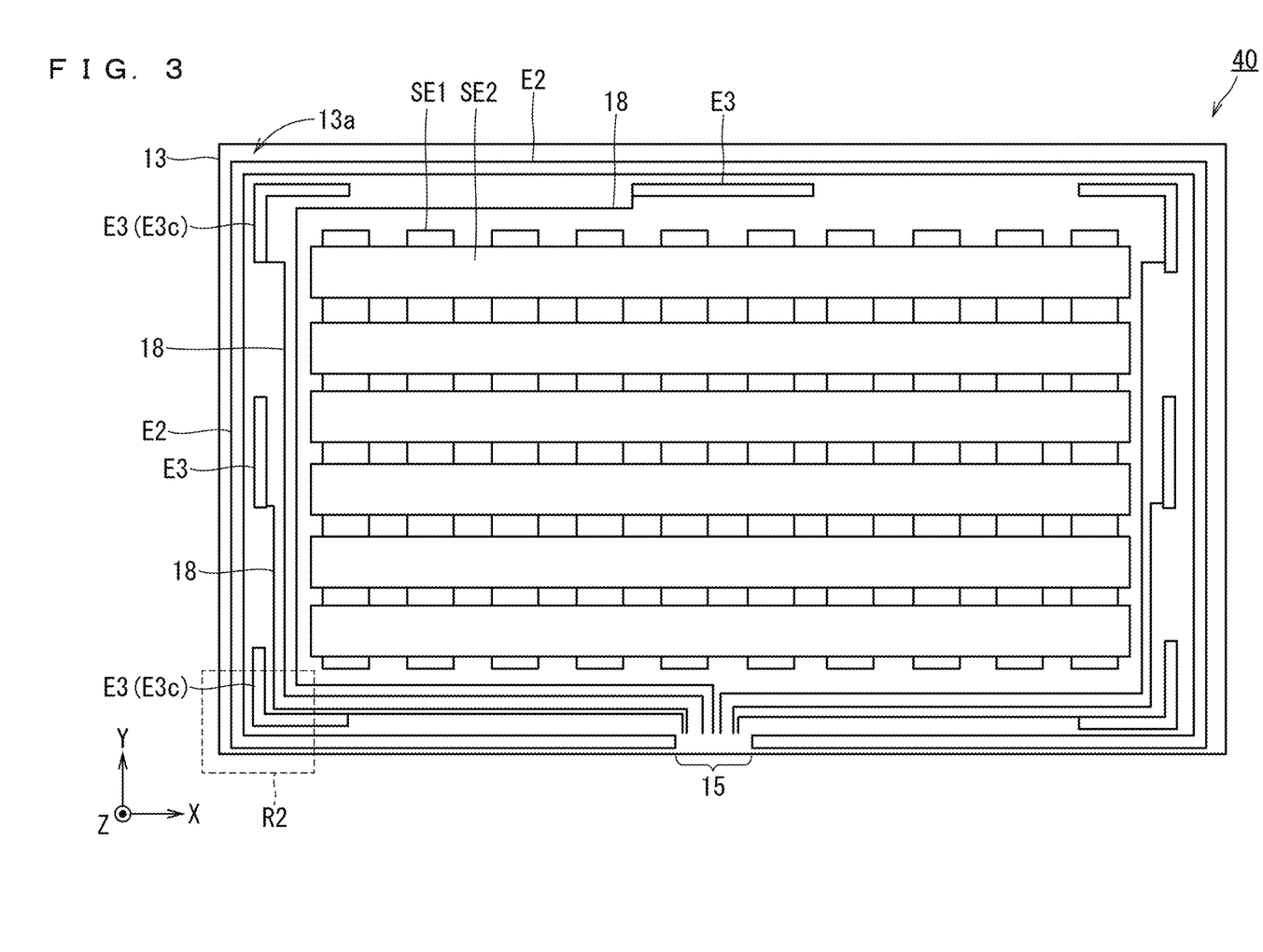
FIG. 3 is a plan view schematically showing the configuration of the touch panel according to the first preferred embodiment.

FIG. 3 is a plan view schematically showing the configuration of the touch panel 40 according to the first preferred embodiment. It should be noted that for the sake of making the configuration of the touch panel 40 easy to understand, FIG. 3 does not show a flat panel cable (FPC) described below.

A shape of the touch panel 40 in a plan view is rectangular with reference to FIGS. 2 and 3. The touch panel 40 includes a sensor substrate 13, a plurality of sensor electrodes SE1, and a plurality of sensor electrodes SE2. The sensor substrate 13 is a base substrate. The sensor substrate 13 is made of glass or resin, it should be noted that as described above, the protective plate 5 covers the touch panel 40 in a plan view. Therefore, the protective plate 5 covers the sensor substrate 13 in a plan view.

The sensor substrate 13 has a principal surface 13a. It should be noted that as described above, the back surface 5b of the protective plate 5 covers the touch panel 40 in a plan view. Therefore, in a plan view, the back surface 5b of the protective plate 5 covers the principal surface 13a of the sensor substrate 13 included in the touch panel 40.

A display region Rg1 and a peripheral region Rg2 exist on the principal surface 13a of the sensor substrate 13. In addition, a plurality of sensor electrodes SE1 are provided on the principal surface 13a of the sensor substrate 13. That is, the sensor substrate 13 is provided with the plurality of sensor electrodes SE1.

The plurality of sensor electrodes SE1 extend in the Y-axis direction. A plurality of sensor electrodes SE2 are provided above the plurality of sensor electrodes SE1. The plurality of sensor electrodes SE2 extend in the X-axis direction.

The plurality of sensor electrodes SE1 and SE2 are electrodes for detecting a touch position with respect to the touch panel built-in display 100 (protective plate 5). As described above, the touch panel 40 is, for example, a capacitive touch panel. Therefore, the plurality of sensor electrodes SE1 and SE2 are electrodes compatible with the capacitive method.

In addition, a protection film 9 is provided on the principal surface 13a of the sensor substrate 13. The plurality of sensor electrodes SE1 and SE2 are covered with and protected by the protection film 9. Thus, it is possible to prevent corrosion and the like due to water from occurring in the plurality of sensor electrodes SE1 and SE2. It should be noted that the protection film 9 does not need to be provided on the principal surface 13a of the sensor substrate 13.

In addition, the sensor substrate 13 is provided with an FPC mounting portion 15. The FPC mounting portion 15 is a portion to which an FPC (not shown) is connected.

Hereinafter, the state in which the principal surface 5a of the protective plate 5 is pressed is also referred to as "pressed state". That is, the pressed state is a state in which the protective plate 5 is pressed. In addition, hereinafter, the state where the principal surface 5a of the protective plate 5 is not pressed is also referred to as "non-pressed state".

In addition, the touch panel built-in display 100 further includes electrodes E1, E2, and E3, it should be noted that the touch panel 40 of the touch panel built-in display 100 includes electrodes E2 and E3.

The electrodes E1, E2, and E3 are pressure sensor electrodes for detecting a pressed state occurring in accordance with the performance of a touch operation. The electrodes E1, E2, and E3 are, for example, electrodes for detecting a pressed state by a mutual capacitance method.

The electrode E1 is, for example, a GND electrode. The shape of the electrode E1 in a plan view is, for example, closed loop shaped. The electrode E1 covers the electrodes E2 and E3 in a plan view. In the present preferred embodiment, the electrode E2 is a transmission electrode. The electrode E3 is a reception electrode. The transmission electrode is an electrode to which a signal described below is supplied.

The electrode E1 is provided in the peripheral region Rg2 on the back surface 5b of the protective plate 5. The electrodes E2 and E3 are provided adjacent to each other in the peripheral region Rg2 on the principal surface 13a of the sensor substrate 13. Capacitance exists between the electrodes E2 and E3. Hereinafter, the distance between the electrodes E2 and E3 adjacent to each other is also referred to as "electrode distance L1".

Here, assume that the principal surface 5a of the protective plate 5 is pressed. In this case, the pressed portion in the protective plate 5 descends toward the adhesive material 10. Therefore, the entire protective plate 5 is curved.

In addition, the electrodes E2 and E3 face the electrode E1. In addition, between the electrode E1 and the electrode E2 and between the electrode E1 and the electrode E3, the adhesive material 10 does not exist, but air layers exist.

In addition, in the present preferred embodiment, the electrode E2, the electrode E3, and the sensor electrode SE1 are formed on the principal surface 13a of the sensor substrate 13. That is, the electrode E2, the electrode E3, and the sensor electrode SE1 exist in the same layer. Therefore, in the manufacturing process of the touch panel in display 100, the electrode E2 and the electrode E3 are formed at the same time as the sensor electrode SE1. Hereinafter, the manufacturing process of the touch panel built-in display 100 is also referred to as "display manufacturing process". Thus, the number of steps in the display manufacturing process can be reduced.

The display region Rg1 of the protective plate 5 has translucency. It should be noted that from the viewpoint of design, black color is usually printed on the peripheral region Rg2 of the protective plate 5.

The electrode E1 is formed, for example, by printing a conductive carbon paste. The carbon paste is black. Therefore, the electrode E1 is black. Therefore, the back surface 5b of the protective plate 5 is provided with a region for black printing.

Thus, the number of steps in the display manufacturing process can be reduced as compared with the manufacturing method of performing the black printing and the formation of the electrode E1 separately. In addition, the electrode E1 is formed in the peripheral region Rg2, different from the display region Rg1, in the protective plate 5. Therefore, it is possible to suppress an increase in light reflectance and a decrease in light transmittance in the peripheral region Rg2 of the protective plate 5.

Figure 4:
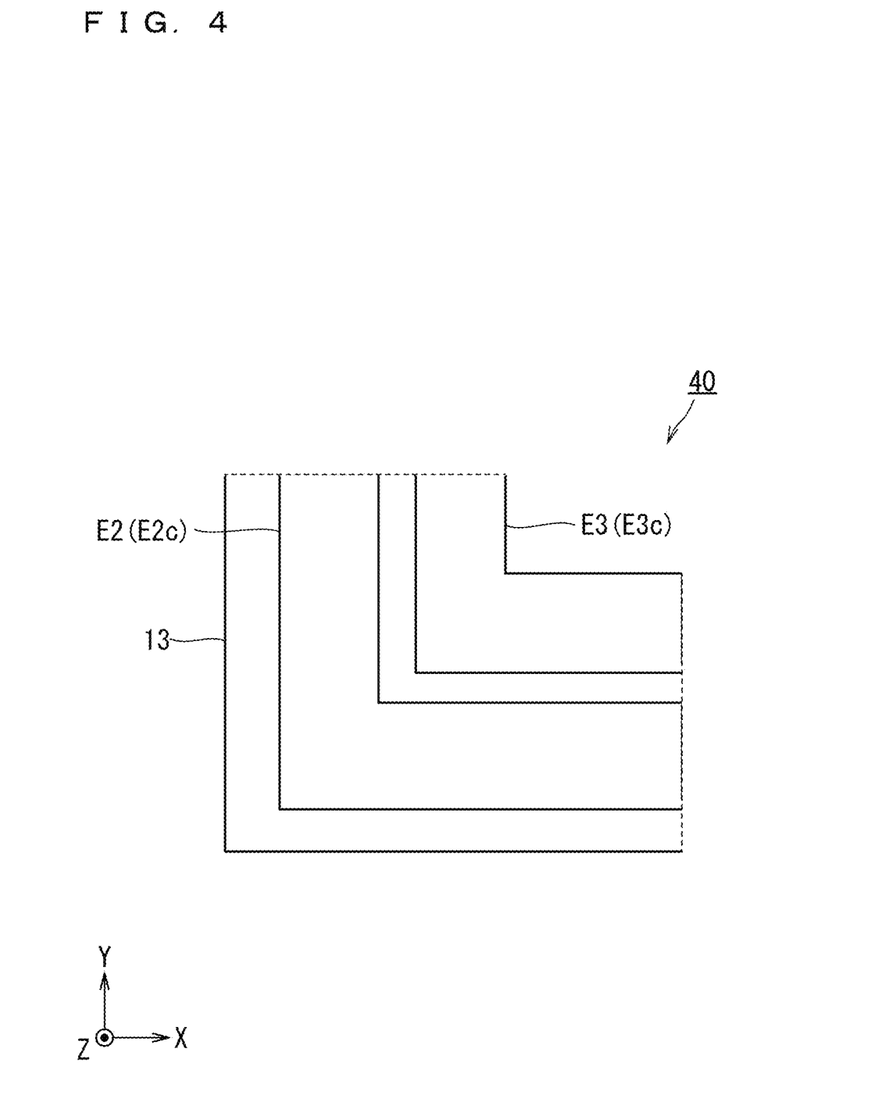
FIG. 4 is an enlarged view of a region R2 in FIG. 3.

Next, the configurations of the electrodes E2 and E3 will be described. FIG. 4 is an enlarged view of the region R2 in FIG. 3. It should be noted that FIG. 4 mainly shows the electrodes E2 and E3 being the main configuration of the present preferred embodiment. With reference to FIGS. 3 and 4, the shape of the electrode E2 in a plan view is closed loop shaped. In the present preferred embodiment, the electrode E3 is divided. In FIG. 3, for example, seven portions of the electrode E3 are divided. Therefore, the touch panel built-in display 100 includes a plurality of electrodes E3.

A wiring line 18 is connected to each of the plurality of electrodes E3. The wiring line 18 is a wiring line for transmitting a signal. The wiring line 18 connected to each of the electrodes E3 is routed to the FPC mounting portion 15. That is, each of the plurality of wiring lines 18 is a routing wiring line that extends to the FPC mounting portion 15. Thus, the electrode E2 and the wiring line 18 are adjacent to each other. In addition, for example, two wiring lines 18 are connected to the respective two adjacent electrodes E3 included in the plurality of electrodes E3. The two wiring lines 18 are adjacent to each other.

Each of the plurality of wiring lines 18 is connected to one end of an FPC (not shown). The other end of the FPC is connected to, for example, a control board (not shown) provided with a control unit (not shown). The control unit is, for example, a central processing unit (CPU). The control unit is connected to the plurality of electrodes E3 via the FPC and the plurality of wiring lines 18.

The plurality of electrodes E3 are provided separately from each other on the principal surface 13a of the sensor substrate 13. Specifically, the plurality of electrodes E3 are dispersedly arranged in the peripheral region Rg2 on the sensor substrate 13 (principal surface 13a). In addition, in a plan view, the plurality of electrodes E3 are provided so as to surround the plurality of sensor electrodes SE1 and SE2.

The plurality of electrodes E3 includes an electrode E3 provided at each of the four corner portions of the touch panel 40 in a plan view. Hereinafter, in a plan view, the electrode E3 provided at the corner portion of the touch panel 40 is also referred to as "electrode E3c". That is, the electrode E3c is provided at each of the four corner portions of the touch panel 40. The shape of the electrode E3c is L-shaped. In addition, the electrode E3 is provided also in a region corresponding to the central portion of each side of the rectangle being the shape of the touch panel 40 in a plan view.

The electrode E2 and the plurality of electrodes E3 are configured such that the electrode E2 surrounds the plurality of electrodes E3 in a plan view. Therefore, the electrode E2 surrounds the plurality of sensor electrodes SE1 and SE2 in a plan view.

It should be noted that a part of the electrode E2 exists at the corner portion of the touch panel 40. Hereinafter, a part of the electrode E2 existing at the corner portion of the touch panel 40 is also referred to as "electrode E2c". The shape of the electrode E2c is L-shaped. The electrode E2c being the electrode E2 is provided at each of the four corner portions of the touch panel 40 in a plan view. It should be noted that the electrode E2c surrounds the electrode E3c adjacent to the electrode E2c in a plan view (see FIG. 4).

Figure 5A:
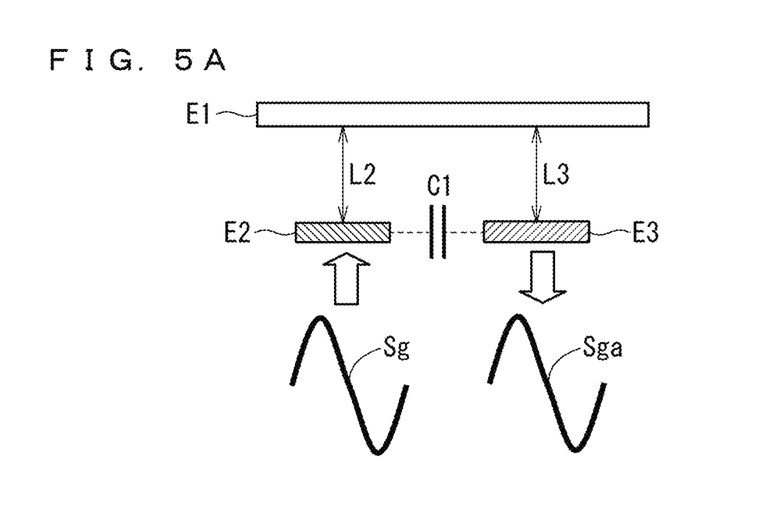
FIGS. 5A and 5B are diagrams for illustrating a press detection method.
Figure 5B:
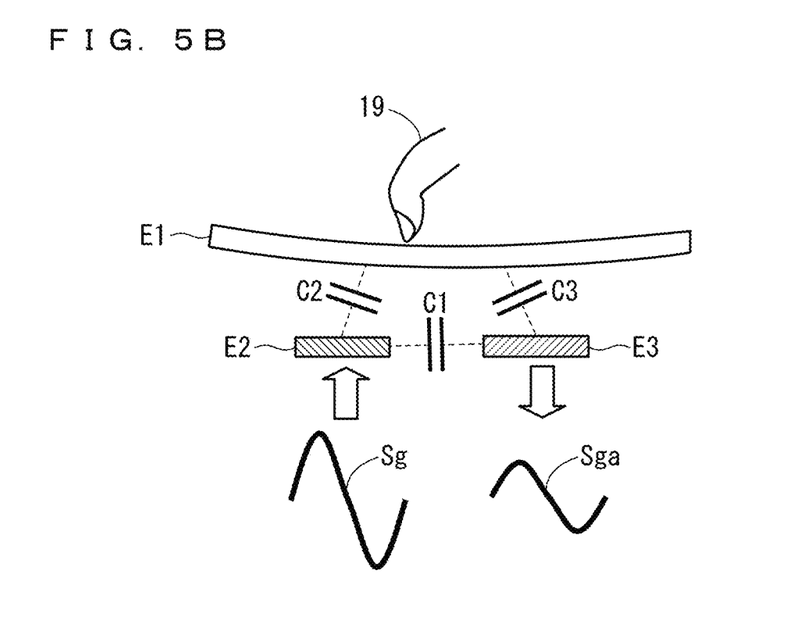

Next, a method for detecting the pressed state of the protective plate 5 (hereinafter, also referred to as "press detection method") will be described. FIGS. 5A and 5B are diagrams for illustrating the press detection method. In FIGS. 5A and 5B, the electrodes E1, E2, and E3 are mainly shown in order to make the press detection method easier to understand.

FIG. 5A is a diagram showing a state of the electrodes E1, E2, and E3 in the non-pressed state. As described above, there exists capacitance between the electrode E2 and the electrode E3. Hereinafter, the signal for detecting the pressed state is also referred to as "signal Sg". The signal Sg shows, for example, a sine wave. In the present preferred embodiment, the signal Sg is supplied to the electrode E2 being the transmission electrode. That is, the electrode E2 is an electrode to which the signal Sg is supplied. The signal Sg supplied to the electrode E2 is transmitted to the electrode E3 being a reception electrode. The adjacent electrodes E2 and E3 are configured such that the signal Sg supplied to the electrode E2 is transmitted to the electrode E3.

In addition, in the present preferred embodiment, the signal Sg is detected at the electrode E3 by the control unit described above. Hereinafter, the signal Sg detected at the electrode E3 is also referred to as "signal Sga". That is, the electrode E3 is an electrode for detecting the signal Sga. The signal Sga is the same signal as the signal Sg or a signal different from the signal Sg. The signal Sga is detected at the electrode E3 by the control unit described above.

Hereinafter, the distance from the electrode E1 to the electrode E2 is also referred to as "distance L2". In addition, hereinafter, the distance from the electrode E1 to the electrode E3 is also referred to as "distance L3".

Here, assume that the pressing operation is performed by the indicator 19 and the pressed state occurs. The pressing operation is an operation of pressing the principal surface 5a of the protective plate 5. When the pressing operation of pressing the principal surface 5a of the protective plate 5 is performed, the pressed portion in the protective plate 5 descends toward the adhesive material 10. Thus, the pressed state occurs. Therefore, the entire protective plate 5 is curved.

Hereinafter, the capacitance between the adjacent electrodes E2 and E3 (mutual capacitance) is also referred to as "capacitance C1". In addition, hereinafter, the capacitance between the adjacent electrodes E1 and E2 is also referred to as "capacitance C2". In addition, hereinafter, the capacitance between the adjacent electrodes E1 and E3 is also referred to as "capacitance C3".

The touch panel built-in display 100 has a function of detecting the capacitance C1 being the mutual capacitance in the mutual capacitance method and the pressed state using the electrodes E1, E2, and E3. It should be noted that since the mutual capacitance method is a known technique, the press detection method will be briefly described.

FIG. 5B is a diagram showing a state of the electrodes E1, E2, and E3 in the pressed state. It should be noted that in FIG. 5B, for example, the protective plate 5 is not shown in order to make the press detection method easier to understand.

In the pressed state, the electrode E1 is closer to the electrodes E2 and E3 than in the non-pressed state. That is, when the state of the protective plate 5 transitions from the non-pressed state to the pressed state, the distance L2 and the distance L3 become shorter (change). Therefore, when the state of the protective plate 5 transitions from the non-pressed state to the pressed state, the capacitance C2 between the electrodes E1 and E2 and the capacitance C3 between the electrodes E1 and E3 increase. In addition, when the state of the protective plate 5 transitions from the non-pressed state to the pressed state, the capacitance C1 between the electrodes E2 and E3 increases.

That is, the capacitance C1 changes as the distance L2 and the distance L3 change. The control unit detects the capacitance C1 being the mutual capacitance by detecting the signal Sga at the electrode E3. It should be noted that the signal Sga detected at the electrode E3 changes by the control unit as the capacitance C1 increases. The control unit detects that the protective plate 5 is pressed due to the increase (change) in the capacitance C1. That is, the control unit of the touch panel built-in display 100 detects the pressed state in which the protective plate 5 is pressed based on the change in the capacitance C1 accompanying the change in the distance L2 and the distance L3.

As described above, according to the present preferred embodiment, the touch panel built-in display 100 includes an electrode E1, an electrode E2, and an electrode E3 for detecting the pressed state in which the protective plate 5 is pressed. The electrode E1 is provided in the peripheral region Rg2 on the back surface 5b of the protective plate 5. The electrodes E2 and E3 are provided adjacent to each other in the peripheral region Rg2 on the principal surface 13a of the sensor substrate 13. That is, the electrode E1, the electrode E2, and the electrode E3 are provided in the peripheral region Rg2 as a configuration for detecting the pressed state.

Thus, it is possible to provide a touch panel built-in display provided with a configuration for detecting the pressed state in the peripheral region.

In addition, in the present preferred embodiment, air layers exist between the electrode E1 and the electrode E2 and between the electrode E1 and the electrode E3. Therefore, it is possible to cause a difference between the deformation amount of the protective plate 5 and the deformation amount of the sensor substrate 13 in the pressed state in which the principal surface 5a of the protective plate 5 is pressed by the indicator 19.

Figure 6:
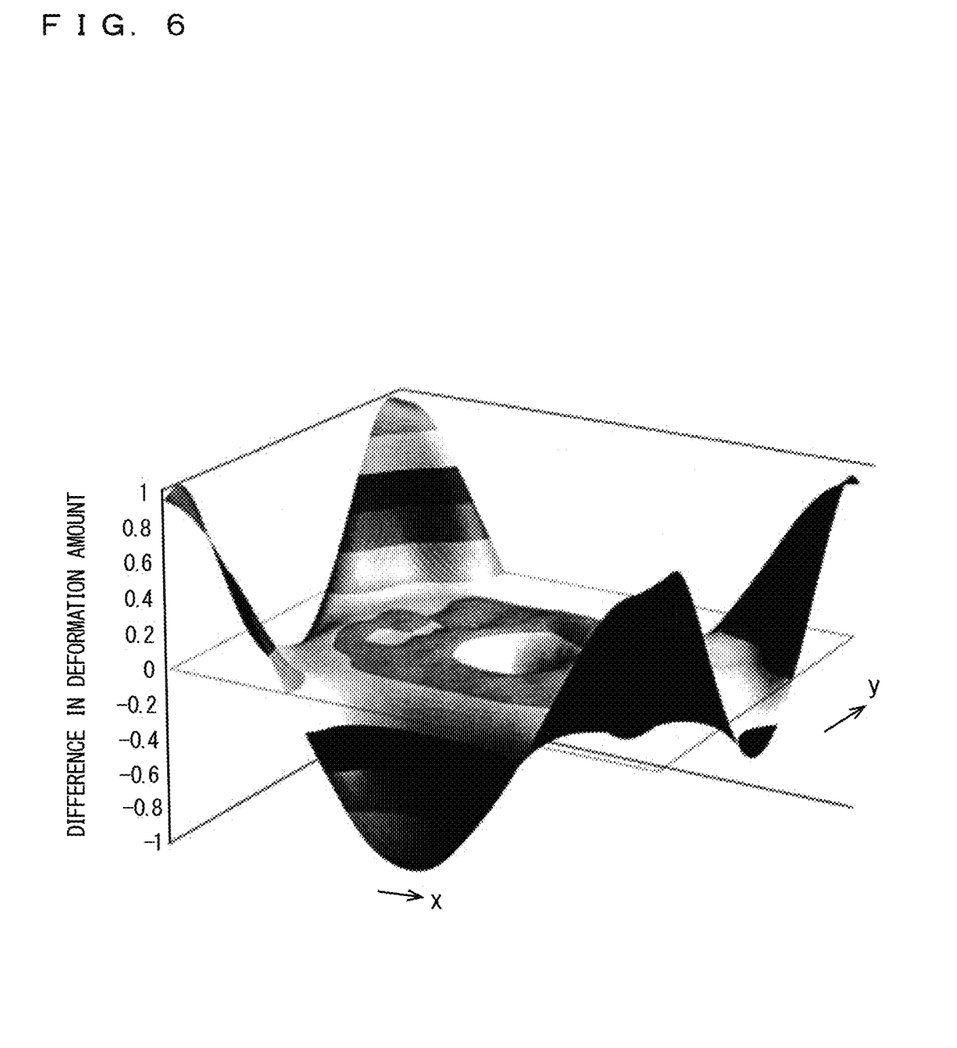
FIG. 6 is a three-dimensionally visualized diagram of an example of a difference in deformation amount.

Hereinafter, the difference between the deformation amount of the protective plate 5 and the deformation amount of the sensor substrate 13 in the pressed state is also referred to as "difference in deformation amount". FIG. 6 is a three-dimensionally visualized diagram of an example of the difference in deformation amount. FIG. 6 shows a state of the difference in deformation mount represented by simulation in a computer, for example. The vertical axis of FIG. 6 represents the difference in deformation amount. In FIG. 6, the "x-direction" corresponds to the X-direction, and the "y-direction" corresponds to the Y-direction. FIG. 6 shows, for example, a state of the difference in deformation amount in a situation where the central portion of the principal surface 5a of the protective plate 5 is pressed.

In addition, in the present preferred embodiment, it is possible to detect the touch position and the pressed state using the robust protective plate being such that the entire protective plate is curved by pressing.

In addition, in the present preferred embodiment, the touch panel built-in display 100 detects the capacitance C1 between the electrode E2 and the electrode E3 existing in the peripheral region Rg2 of the sensor substrate 13 (mutual capacitance). It should be noted that in the pressed state, the deformation amount of the peripheral region Rg2 of the protective plate 5 and the sensor substrate 13 is larger than the deformation amount of the display region Rg1 of the protective plate 5 and the sensor substrate 13. Therefore, it is possible to detect a change in capacitance due to a minute change in pressing.

In addition, in the present preferred embodiment, the plurality of electrodes E3 are dispersedly arranged in the peripheral region Rg2 on the sensor substrate 13 (principal surface 13a). Therefore, the signal Sga can be detected as a detection value at the plurality of electrodes E3. Thus, in the pressed state, if the maximum detection value is selected among a plurality of detection values, the detection sensitivity can be increased.

In addition, the dispersed arrangement of the plurality of electrodes E3 enables independent sensing at each electrode E3. Therefore, it is possible to individually set the detection determination standard based on the difference in deformation amount of the rim portion of the touch panel 40 in the pressed state. Thus, the display region Rg1 can be divided into areas for each determination criterion. Therefore, it is possible to support software having a plurality of determination criteria.

In addition, in the present preferred embodiment, adjusting the electrode distance L1 between the electrode E2 and the electrode E3 makes it possible to adjust the sensitivity for detecting the change in capacitance corresponding to the deformation amount of the protective plate 5.

It should be noted that the above-described related configuration A does not disclose a configuration for detecting the pressed state. Therefore, even if the display including the touch panel of the related configuration A is provided with a robust protective plate, the display cannot detect the pressed state.

In addition, the above-described related configuration B detects the pressed state based on the change in the distance between the touch sensor electrodes in the input region corresponding to the display region. Therefore, the transparent protection film cannot be replaced with a robust protective plate (cover panel).

Therefore, even in the related configurations A and B, there is a problem that a display capable of detecting the touch position and the pressed state using the robust protective plate being such that the entire protective plate is curved by pressing cannot be achieved. On the other hand, in the present preferred embodiment, the protective plate being such that the entire protective plate is curved by pressing is used. Therefore, the touch panel built-in display 100 of the present preferred embodiment can solve the above problems.

It should be noted that in the present preferred embodiment, the electrode E3 is not arranged near the FPC mounting portion 15 as shown in FIG. 3. However, the arrangement state of the plurality of electrodes E3 is not limited to the arrangement state in FIG. 3. For example, the electrodes E3 may be arranged on the left and right sides of the FPC mounting portion 15.

<First Modification>

The configuration of the present modification is applied to the first preferred embodiment. In the first preferred embodiment, the shape of the electrode E3c provided at the corner portion of the touch panel 40 is L-shaped. In addition, in the first preferred embodiment, the shape of the electrode E2c existing at the corner portion of the touch panel 40 is also L-shaped.

It should be noted that as shown in FIG. 6 described above, in the touch panel 40 in the pressed state, the "difference in deformation amount" at each corner portion is the maximum. In addition, the "difference in deformation amount" decreases from each corner portion toward each of the three central portions.

One central portion of the three central portions is a central portion corresponding to between the two corner portions along the x-direction. In addition, another central portion of the three central portions is a central portion corresponding to between the two corner portions along the y-direction. In addition, still another central portion of the three central portions is the central portion of the touch panel 40.

Figure 7:
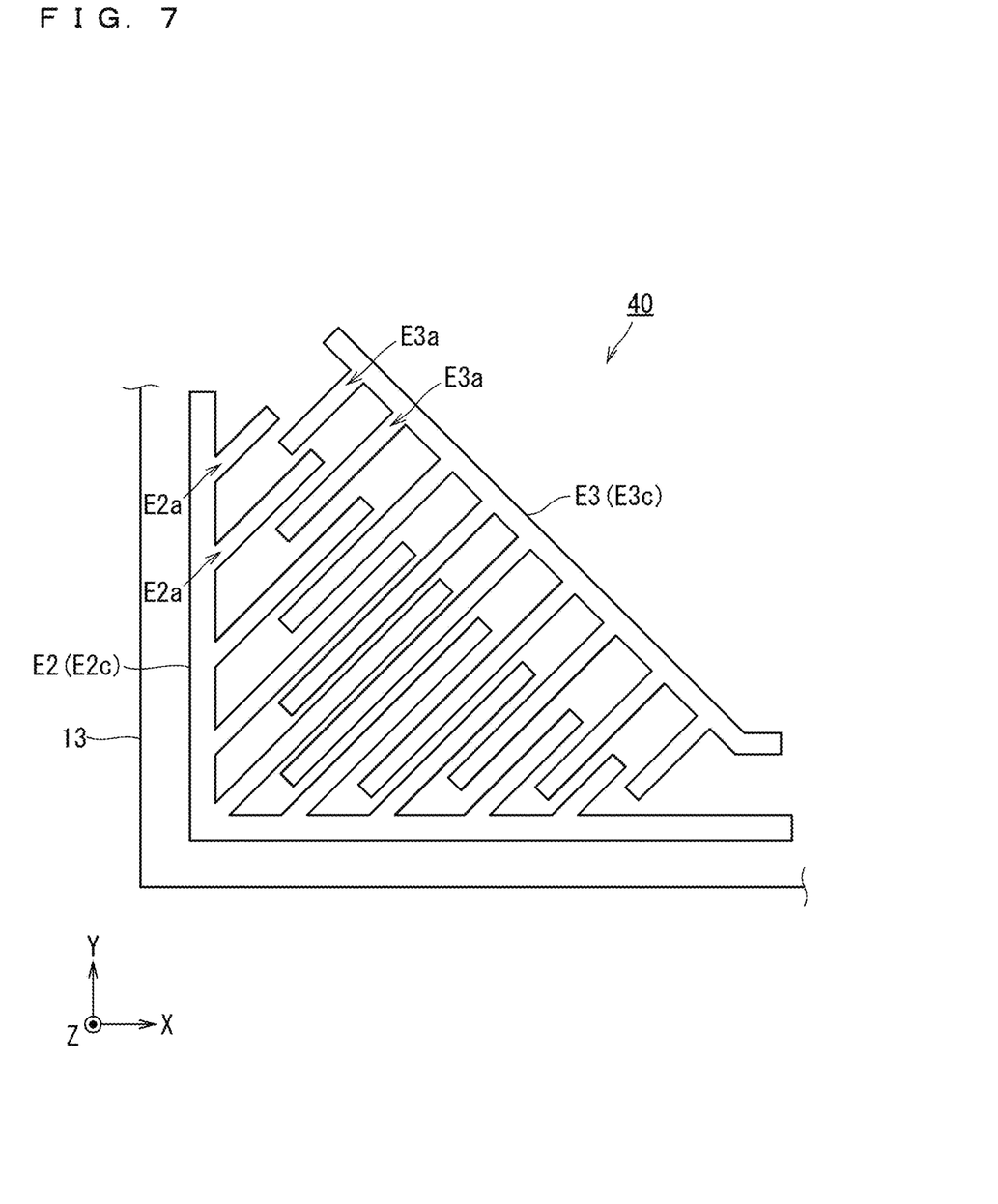
FIG. 7 is a plan view of a corner portion of a touch panel having a configuration of a first modification.

Thus, in the present modification, the shapes of the electrodes E2 and E3 existing at each corner portion of the touch panel 40 are assumed to be shapes suitable for the deformation direction of the touch panel 40. FIG. 7 is a plan view of a corner portion of the touch panel 40 having the configuration of the first modification. In addition, FIG. 7 is an enlarged view of a configuration in which the configuration of the present modification is applied to the configuration of the region R2 in FIG. 3. Hereinafter, the center of the touch panel 40 in a plan view is also referred to as "panel center".

Referring to FIG. 7, the shape of each of the electrodes E2c and E3 existing at the corner portion of the touch panel 40 is comb-teeth shaped. The electrode E2c has a plurality of electrodes E2a. The shape of each of the plurality of electrodes E2a is long-shaped. The plurality of electrodes E2a extend toward the panel center. Thus, at the electrode E2c, a comb-teeth electrode's eye (gap) extending toward the panel center is formed.

In addition, the electrode E3 includes a plurality of electrodes E3a. The shape of each of the plurality of electrodes E3a is long-shaped. The plurality of electrodes E2a and the plurality of electrodes E3a are provided such that the electrodes E2a and the electrodes E3a are alternately arranged.

The configuration in FIG. 7 of the present modification is applied to the electrodes E2a and E3c existing at each corner portion of the touch panel 40.

As described above, according to the present modification, large capacitance can be obtained between the electrodes E2a and E3c at the corner portions of the touch panel 40. Thus, the detection sensitivity to the capacitance can be improved.

<Second Modification>

In the configuration of the first preferred embodiment, the wiring line 18 connected to each of the electrodes E3 is routed to the FPC mounting portion 15. The wiring line 18 transmits a signal. Therefore, there exists parasitic capacitance in the wiring line 18 adjacent to the electrode E2. In addition, parasitic capacitance exists also in at least two adjacent wiring lines 18. The parasitic capacitance causes a decrease in detection sensitivity.

Thus, in the configuration of the present modification, a shield electrode is provided. The configuration of the present modification is applied to all or part of the configurations of the first preferred embodiment and the first modification.

Figure 8:
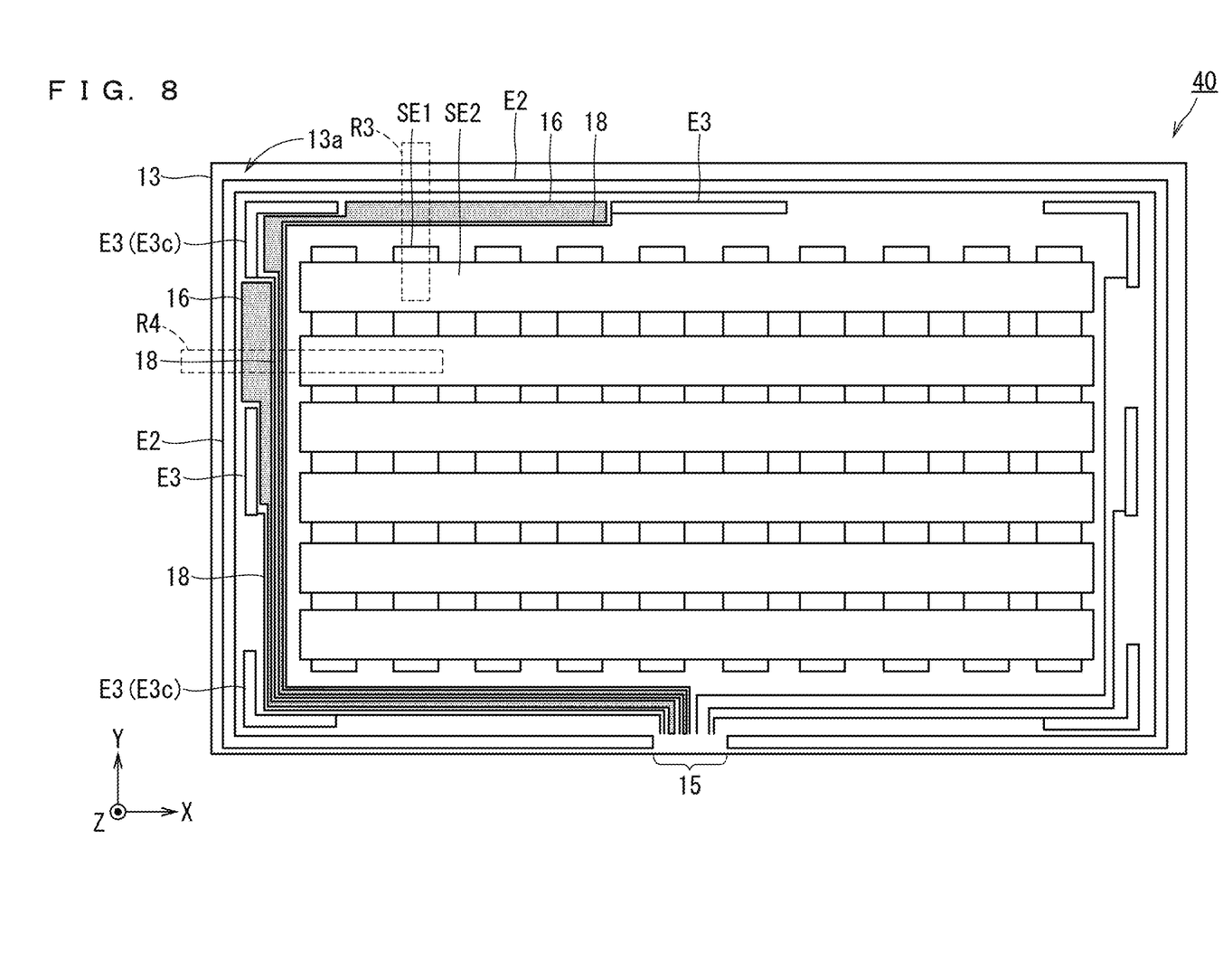
FIG. 8 is a plan view schematically showing a configuration of a touch panel having a configuration of a second modification.
Figure 9:
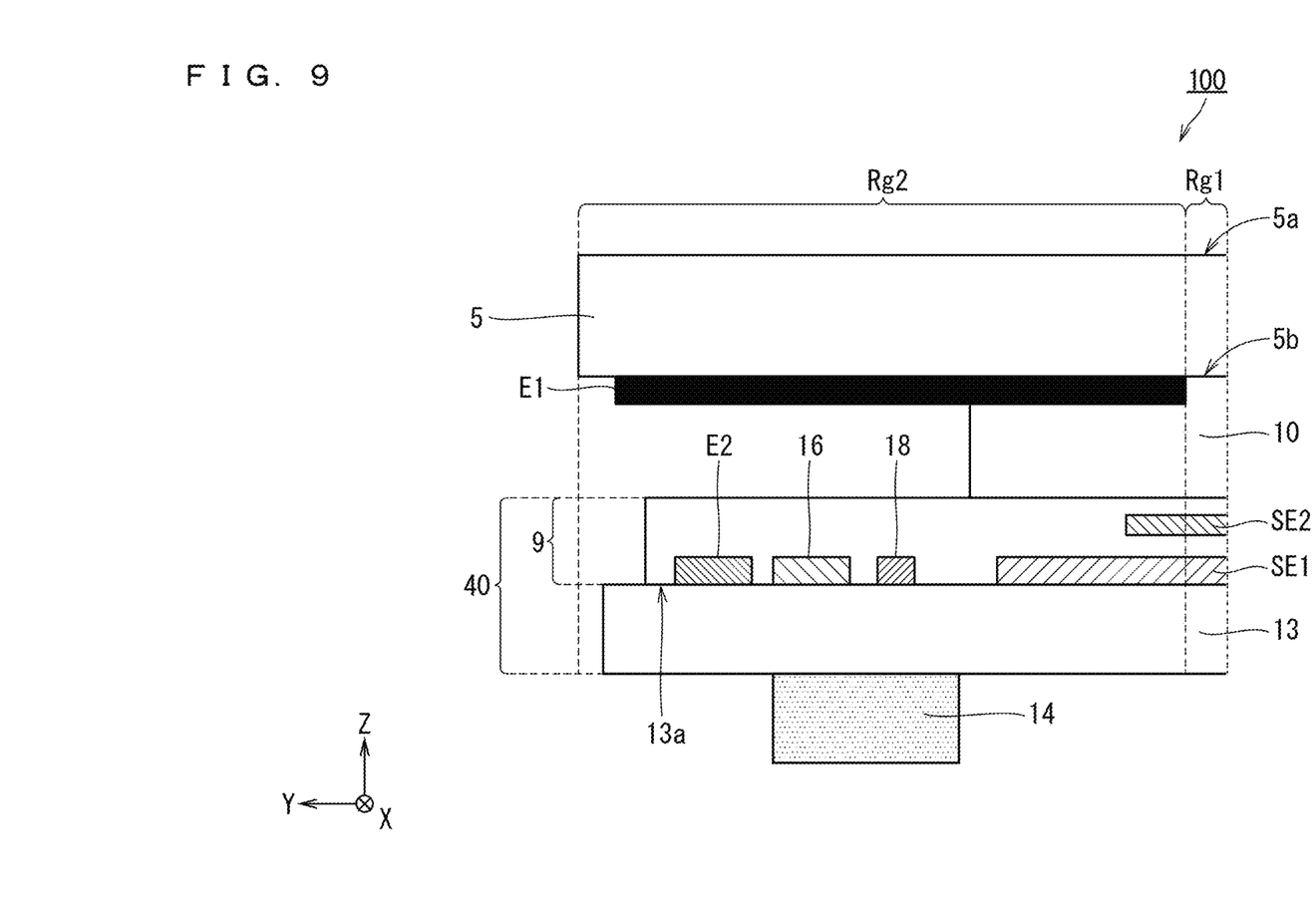
FIG. 9 is a cross-sectional view of the touch panel taken along a YZ plane in a region R3 in FIG. 8.

FIG. 8 is a plan view schematically showing the configuration of the touch panel 40 having the configuration of the second modification. FIG. 8 shows, for example, a touch panel 40 in which the configuration of the present modification is applied to the configuration in FIG. 3. FIG. 9 is a cross-sectional view of the touch panel 40 taken along the YZ plane in the region R3 in FIG. 8. It should be noted that FIG. 9 also shows members on the periphery of the touch panel 40 (such as the protective plate 5, the adhesive material 10, and the adhesive tape 14).

Figure 10:
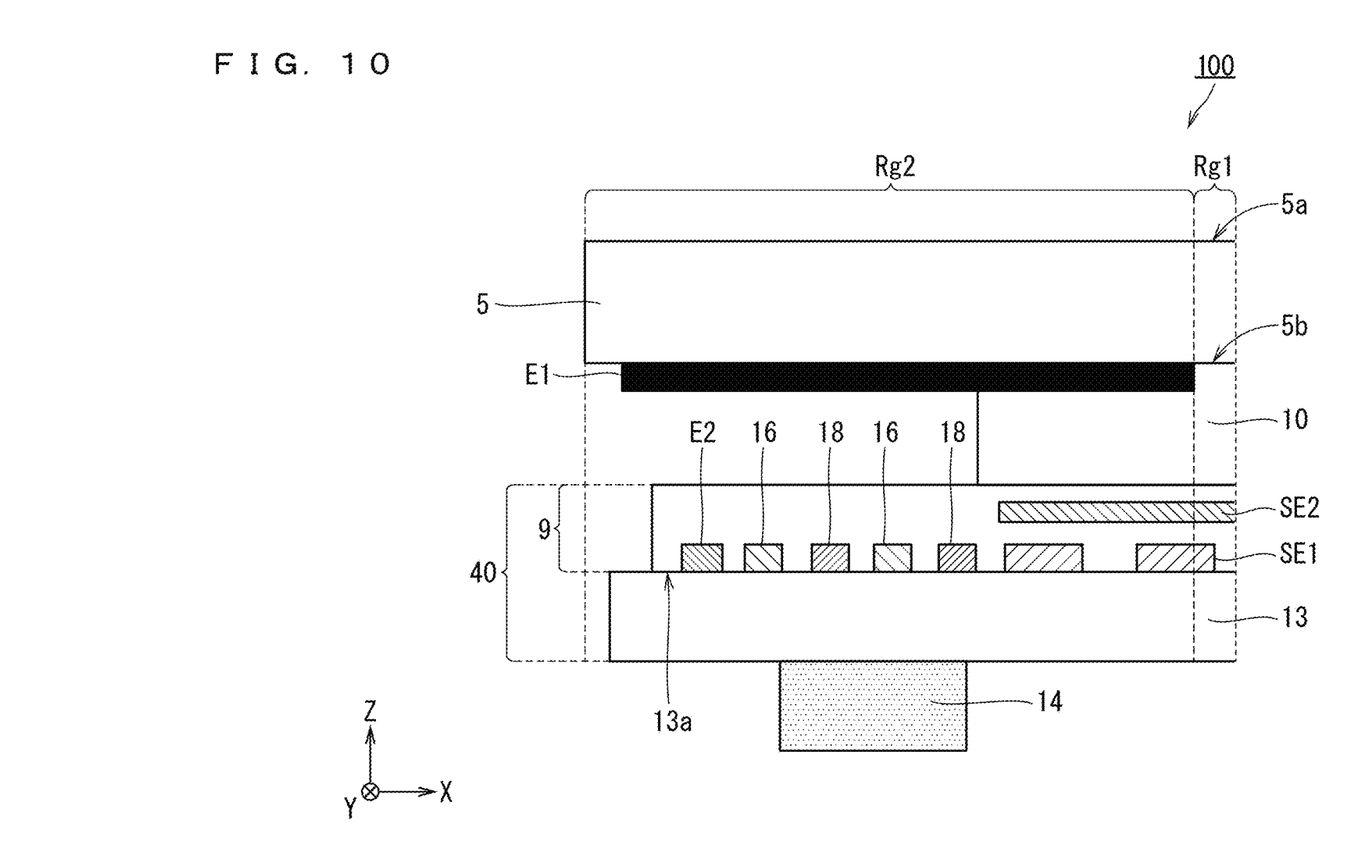
FIG. 10 is a cross-sectional view of the touch panel taken along a XZ plane in a region R4 in FIG. 8.

In addition, FIG. 10 is a cross-sectional view of the touch panel 40 taken along the XZ plane in the region R4 in FIG. 8. It should be noted that FIG. 10 also shows members on the periphery of the touch panel 40 (such as the protective plate 5). It should be noted that the width of each of the electrode E2, the wiring line 18, and the shield electrode 16 described below shown in FIG. 10 are assumed to be the same due to space limitations, and each of the widths is not accurate.

First, with reference to FIGS. 8 and 9, in the configuration of the present modification, a shield electrode 16 is provided between the electrode E2 and the wiring line 18 adjacent to each other. The shield electrode 16 is configured as a wiring line. The shield electrode 16 is configured to discharge static electricity to the ground. The shield electrode 16 is grounded.

In addition, with reference to FIGS. 8 and 10, in the configuration of the present modification, a shield electrode 16 is provided between the two adjacent wiring lines 18.

It should be noted that in the display manufacturing process, the shield electrode 16 is formed simultaneously with the sensor electrode SE1. Thus, the number of steps in the display manufacturing process can be reduced.

As described above, according to the present modification, the shield electrode 16 is provided between the electrode E2 and the wiring line 18 adjacent to each other. In addition, the shield electrode 16 is provided between the two adjacent wiring lines 18. Therefore, the parasitic capacitance between the electrode E2 and the wiring 18 adjacent to each other and the parasitic capacitance between the two adjacent wiring lines 18 can be reduced. Thus, the detection sensitivity to the capacitance can be improved.

In addition, the existence of the shield electrode 16 allows the static electricity to be discharged to the ground via the shield electrode 16 in a situation where the static electricity has entered the touch panel built-in display 100. Therefore, the electrostatic resistance can be improved.

<Third Modification>

The configuration of the present modification is applied to all or part of the configurations of the first preferred embodiment, the first modification, and the second modification.

In the present modification, each of the electrodes E2 and E3 is provided in a different layer. That is, the position of the electrode E2 in the thickness direction of the touch panel built-in display 100 is different from the position of the electrode E3 in the thickness direction. The thickness direction of the touch panel built-in display 100 is the thickness direction (Z-axis direction) of the touch panel 40. Hereinafter, the thickness direction of the touch panel built-in display 100 is also referred to as "panel thickness direction".

For example, a configuration may be used in which the position of the electrode E2 in the panel thickness direction is the same as the position of the sensor electrode SE1 in the panel thickness direction, and the position of the electrode E3 in the panel thickness direction is the same as the position of the sensor electrode SE2 in the panel thickness direction. In the display manufacturing process of the configuration, the electrode E2 is formed simultaneously with the sensor electrode SE1, and the electrode E3 is formed simultaneously with the sensor electrode SE2.

Also in the configuration of the present modification, the number of steps in the display manufacturing process can be reduced.

It should be noted that in the configuration in which the configuration of the present modification is applied to the configuration of the second modification, for example, the position of the shield electrode 16 in the panel thickness direction is the same as the position of the sensor electrode SE2 in the panel thickness direction. In the configuration, furthermore, for example, the position of the electrode E3 in the panel thickness direction is the same as the position of the sensor electrode SE2 in the panel thickness direction. In the display manufacturing process of the configuration, the shield electrode 16 is formed simultaneously with the electrode E3 and the sensor electrode SE2. Thus, the number of steps in the display manufacturing process can be reduced.

<Fourth Modification>

The configuration of the present modification is applied to all or part of the configurations of the first preferred embodiment, the first modification, the second modification, and the third modification.

The configuration of the present modification is a configuration in which the position of the electrode E3 in a plan view and the position of the electrode E2 in a plan view are exchanged for each other. That is, in the present modification, the electrode E2 and the plurality of electrodes E3 are configured such that the plurality of electrodes E3 surround the electrode E2 in a plan view.

For example, a configuration in which the configuration of the present modification is applied to the configuration in FIG. 3 being the configuration of the first preferred embodiment (hereinafter, also referred to as "modified configuration A") will be described. The modified configuration A is a configuration obtained by modifying the configuration in FIG. 3. In the modified configuration A, a plurality of electrodes E3 surround the electrode E2 in a plan view.

Also in the present modification, effects in the configuration to which the present modification is applied can be obtained.

<Fifth Modification>

The configuration of the present modification is applied to all or part of the configurations of the first preferred embodiment, the first modification, the second modification, and the third modification.

In the configuration of the present modification, the electrode E2 is divided. That is, the touch panel built-in display 100 having the configuration of the present modification includes a plurality of electrodes E2. In addition, in the present modification, the plurality of electrodes E2 and the electrode E3 are configured such that the plurality of electrodes E2 surround the electrode E3 in a plan view.

In addition, in the present modification, the electrode E3 is a transmission electrode and the electrode E2 is a reception electrode. The above-described signal Sg is supplied to the electrode E3 being the transmission electrode. That is, the electrode E3 is an electrode to which the signal Sg is supplied. The signal Sg supplied to the electrode E3 is transmitted to the electrode E2 being a reception electrode.

In addition, in the present modification, the signal Sg is detected at the electrode E2 by the control unit described above. Hereinafter, the signal Sg detected at the electrode E2 of the present modification is also referred to as "signal Sga". That is, the electrode E2 of the present modification is an electrode for detecting the signal Sga.

For example, a configuration in which the configuration of the present modification is applied to the configuration in FIG. 3 being the configuration of the first preferred embodiment (hereinafter, also referred to as "modified configuration B") will be described. The modified configuration B is a configuration obtained by modifying the configuration in FIG. 3. In the modified configuration B, for example, the electrode E2 in FIG. 3 is divided. That is, the touch panel built-in display 100 having the modified configuration B has a plurality of electrodes E2.

In addition, in the modified configuration B, the electrode E3 is a transmission electrode and the electrode E2 is a reception electrode. Therefore, also in the modified configuration B, the pressed state can be detected as in the first preferred embodiment. Also in the present modification, effects in the configuration to which the present modification applied can be obtained.

(Other Modifications)

It should be noted that in the present invention, the preferred embodiment and each of the modifications can be freely combined, and the preferred embodiment and each of the modifications can be appropriately modified or omitted within the scope of the present invention.

For example, in the configuration in FIG. 2, the positions of the electrodes E2 and E3 in the panel thickness direction may be the same as the position of the sensor electrode SE2 in the panel thickness direction. In the display manufacturing process of the configuration, the electrode E2 and the electrode E3 are formed simultaneously with the sensor electrode SE2.

In addition, for example, the electrode E3 may be provided only at the corner portion of the touch panel 40. In addition, for example, the electrode E3 may be provided in a portion different from the corner portion in the touch panel 40.

While the invention has been shown and described in detail, the foregoing description is in all aspects illustrative and not restrictive. It is therefore understood that numerous modifications and variations can be devised.

What is claimed is:

1. A touch panel built-in display having a display region for displaying an image and a peripheral region provided on a periphery of the display region, the touch panel built-in display comprising:
    a sensor electrode configured to detect a touch position with respect to the touch panel built-in display, the sensor electrode compatible with a capacitance method;
    a sensor substrate provided with the sensor electrode;
    a protective plate configured to cover the sensor substrate, the protective plate having flexibility; and
    a first electrode, a second electrode, and a third electrode configured to detect a pressed state in which the protective plate is pressed,
    wherein the sensor substrate has a principal surface on which the display region and the peripheral region exist,
    the protective plate has a back surface for covering the principal surface of the sensor substrate,
    the display region and the peripheral region exist on the back surface of the protective plate,
    in the peripheral region on the back surface of the protective plate, the first electrode is provided,
    in the peripheral region on the principal surface of the sensor substrate, the second electrode and the third electrode are provided adjacent to each other, and
    the touch panel built-in display detects the pressed state in which the protective plate is pressed based on change in capacitance between the second electrode and the third electrode accompanying change in a distance from the first electrode to the second electrode and a distance from the first electrode to the third electrode, wherein
    the second electrode and the third electrode are covered with a protection film,
    an air gap exists between the protection film, which covers the second electrode and the third electrode, and the first electrode,
    the protection film covering the second electrode and the third electrode covers the sensor electrode existing in the display region,
    the touch panel built-in display further comprising:
    a touch panel including the sensor electrode, the sensor substrate, the second electrode, and the third electrode,
    an adhesive material sticking the protective plate to the touch panel, and
    the air gap is formed between the first electrode, which is above the second electrode and the third electrode, and the protection film by the adhesive material.

2. The touch panel built-in display according to claim 1, wherein the second electrode and the third electrode are configured such that the second electrode surrounds the third electrode in a plan view.

3. The touch panel built-in display according to claim 1, wherein the second electrode is an electrode to which a signal for detecting the pressed state is supplied, and the third electrode is an electrode for detecting the signal.

4. The touch panel built-in display according to claim 1, wherein a shape of each of the second electrode and the third electrode is comb-teeth shaped.

5. The touch panel built-in display according to claim 4, wherein a shape of the touch panel in a plan view is rectangular, and the second electrode and the third electrode are provided at a corner portion of the touch panel.

6. The touch panel built-in display according to claim 1, wherein a position of the second electrode in a thickness direction of the touch panel built-in display is different from a position of the third electrode in the thickness direction.

7. The touch panel built-in display according to claim 1, wherein a wiring line is connected to the third electrode, the second electrode and the wiring line are adjacent to each other, and a shield electrode is provided between the second electrode and the wiring line.

8. The touch panel built-in display according to claim 1, comprising a plurality of third electrodes including the third electrode, and wherein the plurality of third electrodes are provided separately from each other on the principal surface of the sensor substrate.

9. The touch panel built-in display according to claim 8, wherein two wiring lines are connected to respective two third electrodes included in the plurality of third electrodes, the two wiring lines are adjacent to each other, and a shield electrode is provided between the two wiring lines.

10. The touch panel built-in display according to claim 1, comprising a plurality of third electrodes including the third electrode, and wherein the second electrode and the plurality of third electrodes are configured such that the plurality of third electrodes surround the second electrode in a plan view.

11. The touch panel built-in display according to claim 1, comprising a plurality of second electrodes including the second electrode, wherein the plurality of second electrodes and the third electrode are configured such that the plurality of second electrodes surround the third electrode in a plan view, the third electrode is an electrode to which a signal for detecting the pressed state is supplied, and the second electrode is an electrode for detecting the signal.

12. The touch panel built-in display according to claim 1, wherein the first electrode is a ground (GND) electrode.

13. The touch panel built-in display according to claim 1, wherein the first electrode is provided by printing black conductive carbon paste.

14. The touch panel built-in display according to claim 1, wherein the air gap exists in the peripheral region.

15. The touch panel built-in display according to claim 1, wherein the second electrode and the third electrode exist in the same layer on the principal surface of the sensor substrate.

* * * * *